UNITED STATES PATENT OFFICE.

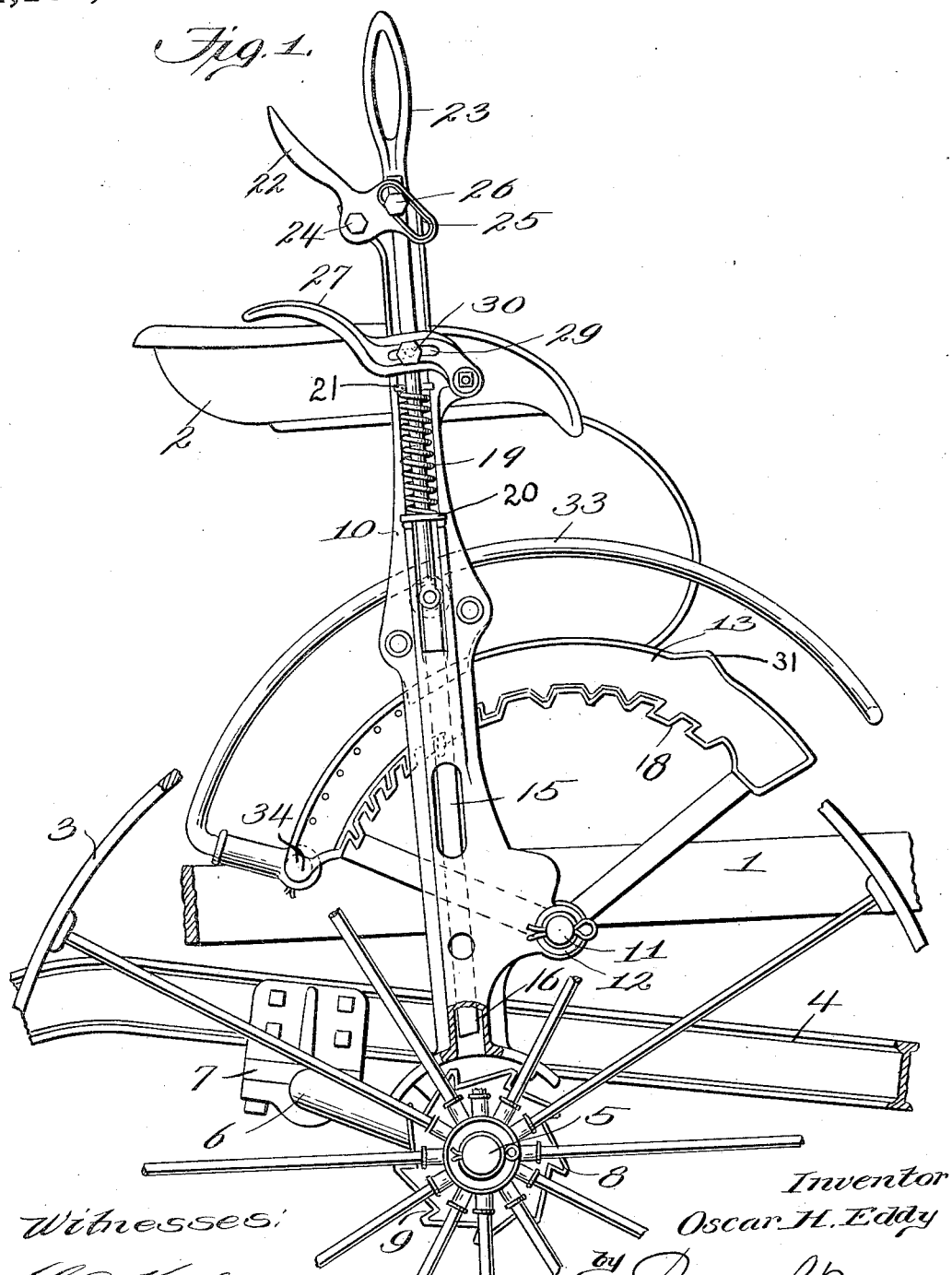

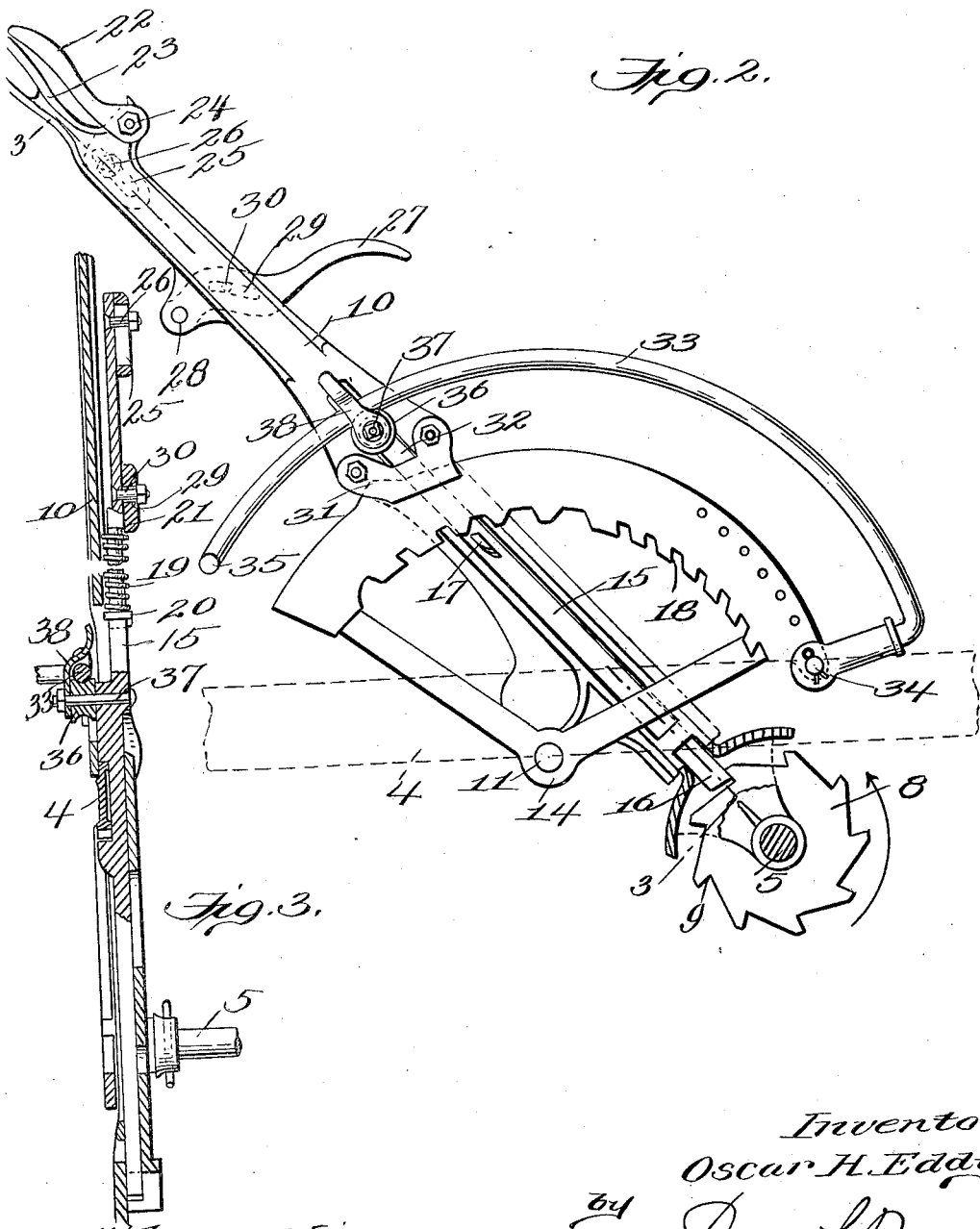

OSCAR H. EDDY, OF GREENWICH, NEW YORK, ASSIGNOR TO W. EDDY PLOW COMPANY, OF GREENWICH, NEW YORK, A CORPORATION OF NEW YORK.

SULKY-PLOW.

1,102,891.  Specification of Letters Patent.   Patented July 7, 1914.

Application filed July 11, 1913. Serial No. 778,606.

*To all whom it may concern:*

Be it known that I, OSCAR H. EDDY, a citizen of the United States, residing at Greenwich, in the county of Washington and State of New York, have invented new and useful Improvements in Sulky-Plows, of which the following is a specification.

The present invention relates to improvements in sulky plows, and the primary object of the invention is to provide simple and improved means whereby the plow or plows may be easily and conveniently lifted or raised to an inoperative position under the control of a pedal which is adapted to be actuated by the foot of the driver or operator, the pedal serving to connect the plow-lifting mechanism to one of the ground wheels whereby forward movement of the vehicle will transmit motion to the plow-lifting mechanism, thereby lifting the plow by power, and when the plow has been lifted to the desired extent the plow-lifting mechanism is automatically disconnected from the wheel. Preferably, the foot or pedal control is combined with the usual or any suitable manually-controlled mechanism, thereby enabling the driver or operator to cause lifting of the plow or plows either by the hand or the foot as may be most convenient.

To these and other ends, the invention consists in certain improvements, and combinations and arrangements of parts, all as will be hereinafter more fully described, the novel features being pointed out particularly in the claims at the end of the specification.

In the accompanying drawings:—Figure 1 represents a side elevation of the main portion of a riding or sulky plow equipped with the improvements embodying the present invention; Fig. 2 is a view similar to Fig. 1 with parts broken away and showing the position occupied by the plow-lifting mechanism when the plow or implement is lifted or raised from the ground and to an inoperative position; Fig. 3 represents a section on the line 3—3 of Fig. 2.

Similar parts are designated by the same reference characters in the several views.

The present invention provides a pedal or foot-operated means for controlling the lifting or raising of a plow or implement from the ground by power derived from the movement of the vehicle, and this improvement is capable of application generally to plows of various kinds. It is preferable, however, to use the plow or foot-operated means in connection with the usual or any suitable manually-operated means whereby the plow or implement may be raised either by the hand or the foot of the operator. An apparatus of this kind is shown in the accompanying drawings and will be hereinafter described in detail, although it is to be understood that this embodiment of the invention is but one example thereof, and that modifications and changes may be made to adapt the invention to plows of different types embodying the principles of the invention.

In the present instance, the invention is shown applied to a sulky plow of a well-known type and which is fully disclosed in the patent to Wiard and Bullock, No. 286,517, dated October 9, 1883, to which reference may be had for a general understanding of the plow to which the present embodiment of the invention is applied. The construction of the plow may be described briefly as embodying a main frame 1 which supports the driver's or operator's seat 2, the ground wheels 3 at each side of the frame, and a plow beam 4 which may be connected, as usual, to the draft apparatus. It is common to use two plow beams, each bearing a plow at the respective side of the vehicle, the plows being reversible in order that they may operate alternately in the soil. Each ground wheel is revolubly mounted on a shaft 5, the latter being formed with a bail 6 which lies beneath the respective plow beam and is connected thereto by a suitable bearing 7. Each ground wheel has a ratchet wheel or clutch member 8 which is rigidly secured to the hub thereof, the teeth of the ratchet wheel or clutch member presenting operating faces or shoulders 9 toward the direction in which the ratchet wheel or clutch member rotates, as indicated by the arrow in Fig. 2. The hand lever 10 is fixed to the respective shaft 5, and this hand lever is pivotally connected to or fulcrumed on the main frame 1 by a pin 11 which is co-axial with the inner end of the bail 6 and coöperates with a bearing 12 on the hand lever which bearing is preferably offset forwardly from the lever, as shown.

Means is provided for locking each plow-lifting mechanism in any desired position, such means in the present instance embodying a locking sector 13 which is fixed to the frame 1 and has an eye 14 which engages the pin 11 whereby the sector is centered with respect to the axis of motion of the hand lever 10. The hand lever is provided with a reciprocatory bar or member 15 which is guided to move longitudinally of the lever, the lower end of this bar forming a dog 16 which, when depressed, coöperates with the ratchet wheel or clutch member 8 on the respective ground wheel, and this bar or member 15 is also provided with a dog 17 which is adapted to coöperate with the notched or toothed portion 18 of the locking sector, the dog 17 coöperating with the sector and the dog 16 disengaging from the clutch member or ratchet wheel 8 when the bar or member 15 is elevated, thereby disconnecting the plow-lifting mechanism from the ground wheel and locking the plow in the desired position, and when the bar or member 15 is depressed, the dog 17 is disengaged from the locking sector and the dog 16 is engaged with the clutch member or ratchet wheel 8, thereby unlocking the plow-lifting mechanism and operatively connecting it to the ground wheel whereby forward motion of the vehicle will lift the plow by power from the ground. This arrangement also enables the plow to be lifted from the ground when the vehicle is stationary, the operator then applying power to the hand lever 10 to swing the latter forward or toward the right in Fig. 1 after the bar or member 15 has been operated sufficiently to disengage the dog 17 thereof from the locking sector. Normally, the bar or member 15 is held in a position to lock the lever 10 to the sector and to disconnect it from the clutch member on the ground wheel, a spring 19 being provided for this purpose, the lower end of the spring bearing on a seat 20 on the lever 10, and the upper end of the spring bearing on a seat 21 on the bar or member 15 and tending to lift or raise the same.

Means may be provided for releasing or unlocking the bar or member 15 from its sector, and when desired, for connecting the plow-lifting mechanism embodying the lever 10 to the ground wheel, a grip 22 being shown in the present instance which is located toward the upper end of the lever 10 and in coöperative relation with the handle portion 23 thereon which may be conveniently reached and operated by the driver when occupying the seat, this grip being pivoted to the lever 10 at 24 and being provided with a cam slot 25 which coöperates with a pin 26 attached to the upper end of the bar 15, and an auxiliary handle 27 is provided which may be conveniently reached and operated by the driver from the ground, this auxiliary handle being pivoted to the lever 10 at 28 and is provided with a cam slot 29 which coöperates with a pin or projection 30 secured to or formed on the bar 15, movement of the grip 22 toward the handle 23 or downward movement of the auxiliary handle 27 serving to lower or depress the bar or member 15, thereby unlocking it from the sector and operatively connecting it to the clutch member on the respective ground wheel.

The mechanism described is in general use and is disclosed in the prior patent hereinbefore mentioned. The present invention provides simple and effective means whereby the control or operation of the plow-lifting mechanism may be effected conveniently by the foot of the driver or operator, thereby enabling the driver's hands to be free for the management of the team or for other purposes, and in the preferred embodiment of the invention the foot control merely requires the driver or operator to depress the pedal, whereupon lifting of the plow is effected automatically. In order to automatically arrest the lifting movement of the plow when the same has reached the proper height, a cam 31 is provided, this cam in the present instance being formed on the upper edge of the sector and arranged to act on a dog 32 on the bar 15 when the lever 10 has reached the proper point, this cam 31 lifting the bar 15, thereby uncoupling the dog 16 from the ratchet wheel 8 and by the same operation engaging the dog 17 with the sector. In the construction shown, the pedal 33 is pivoted on the sector at 34 and has an arc-shaped portion which is substantially concentric with the axis or center of the sector and is provided at its free end with a foot-piece 35. The arc-shaped portion of the pedal lies beside the lever 10 and bears on a roller or projection 36, the latter being journaled on a pin 37 attached to the lever 10, and a guard 38 is provided which overlies the arc-shaped portion of the pedal resting on the roller and thereby retains the pedal in coöperative relation with the roller. By pressing downwardly on the foot-piece 35 of the pedal, the bar 15 is depressed, thereby unlocking the lever 10 from the sector and coupling the bar 15 to the clutch member 8 on the ground wheel, the lifting movement of the plow being arrested automatically when the plow reaches the desired height by the cam 31 and disengagement of the clutch members 8 and 16 during the lifting operation is prevented by pressure upon the foot-piece of the pedal, the arc-shaped portion of the pedal then bearing on the roller 36 and causing the bar 15 to remain in actuated position until rendered inoperative by the cam 31. When it is desired to lower the plow, the bar or member 15 is depressed either by hand manipulation of the grip 22, the handle 27, or by depression of the pedal 33 sufficiently to disengage the dog 17 from the locking sector 18 without engaging the lower end 16 of the bar 15 with the ratchet wheel 8. Owing to the curved or arc-shaped formation of the pedal 33, the latter remains in operative relation with the bar 15, irrespective of the position occupied by the lever 10, and hence the pedal is capable of releasing the bar 15 whether the plow is fully raised or is partially raised.

I claim is my invention:—

1. In a sulky plow, the combination of a plow beam, a lever shiftable to lift the beam, a member on said lever for connecting the latter to one of the ground wheels, and an operating pedal having an arc-shaped portion coöperative with said member on the lever as the latter swings to lift or lower the plow beam.

2. In a sulky plow, the combination of a plow beam, a lever shiftable to lift the beam, a member on said lever for connecting the latter to one of the ground wheels, and a pedal having an arc-shaped portion coöperative with said member on the latter irrespective of the shifting movements of said lever.

3. In a sulky plow, the combination of a plow beam, a lever shiftable to lift the beam, a member on said lever for connecting the latter to one of the ground wheels, a roller on said member, an operating pedal having an arc-shaped portion bearing on said roller, and a guard retaining the pedal and roller in coöperative relation.

In testimony whereof I have hereunto set my hand in presence of two subscribing witnesses.

OSCAR H. EDDY.

Witnesses:
 ISIDORE M. SONN,
 EARL C. BRIGGS.

Copies of this patent may be obtained for five cents each, by addressing the "Commissioner of Patents, Washington, D. C."